ELECTRIC PULSE GENERATING SYSTEMS

Filed Dec. 27, 1956 4 Sheets-Sheet 1

INVENTOR
James A.T. French,
BY Hall & Houghton
ATTORNEY

INVENTOR
James A. T. French,
BY Hall & Houghton
ATTORNEY

ELECTRIC PULSE GENERATING SYSTEMS

Filed Dec. 27, 1956

4 Sheets-Sheet 3

INVENTOR
James A. T. French,
BY Hall & Houghton
ATTORNEY

May 1, 1962 J. A. T. FRENCH 3,032,747

ELECTRIC PULSE GENERATING SYSTEMS

Filed Dec. 27, 1956 4 Sheets-Sheet 4

INVENTOR
James A.T. French,
BY Hall & Houghton
ATTORNEY

United States Patent Office 3,032,747
Patented May 1, 1962

3,032,747
ELECTRIC PULSE GENERATING SYSTEMS

James Alfred Thomas French, Kenton, England, assignor to Her Majesty's Postmaster General, London, England Filed Dec. 27, 1956, Ser. No. 630,995
Claims priority, application Great Britain Dec. 29, 1955
2 Claims. (Cl. 340—172.5)

This invention relates to register-translators.

According to the present invention a register translator comprises a plurality of transformer cores, an input winding for each core, a plurality of pulse train generators, connections from said generators to said input windings, a number of code wires each inductively coupled by said cores to a selection of said input windings, and, a number of translation wires each inductively coupled by said cores to another selection of said input windings, each translation wire corresponding with one of said code wires, rectifiers series connected with said code wires and said translation wires, biassing means for rendering said rectifiers normally non-conductive, pulsing means connected to both said code wires and said translation wires, coincidence detection means, means—code output equipment—for cyclically presenting coded pulses to said detection means, means for connecting said code wires to said detection means, translation storage apparatus—translation storage—gating means connected between said translation wires and said translation storage apparatus for gating into said storage apparatus the output of a translation wire upon coincidence being detected by said coincidence detecting means.

Examples of the invention will now be described in greater detail with reference to the accompanying drawings of which:

Figure 1:
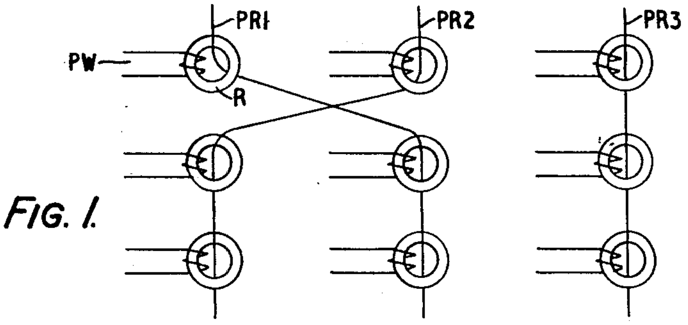
FIG. 1 illustrates the basic principle of the invention.

FIG. 1 shows a number of transformers having toroidal cores or rings R. Each core has an input primary winding PW connected to a pulse source (not shown) whilst an output or secondary winding of the core comprises lead PR1, PR2 . . . It will be seen that the leads are merely threaded through a selection of the cores R, the selection depending upon the particular combination of pulses which it is desired to produce on the lead. The leads PR1, PR2 . . . are shown in FIG. 1 as being inductively coupled by means of the toroidal transformers but it will be understood that other forms of inductive couplings may be used and suitable forms of coupling are shown in the specification of co-pending patent application No. 603,650.

It is not necessary to provide individual pulse sources for each transformer as the latter can be used to combine pulses from several sources. By using combinations of pulses from several sources the number of actual sources required is reduced. This method also considerably reduces the total power requirements as power is only taken from the pulse sources when the pulses are actually used and the sources are able to operate more efficiently.

Figure 2:
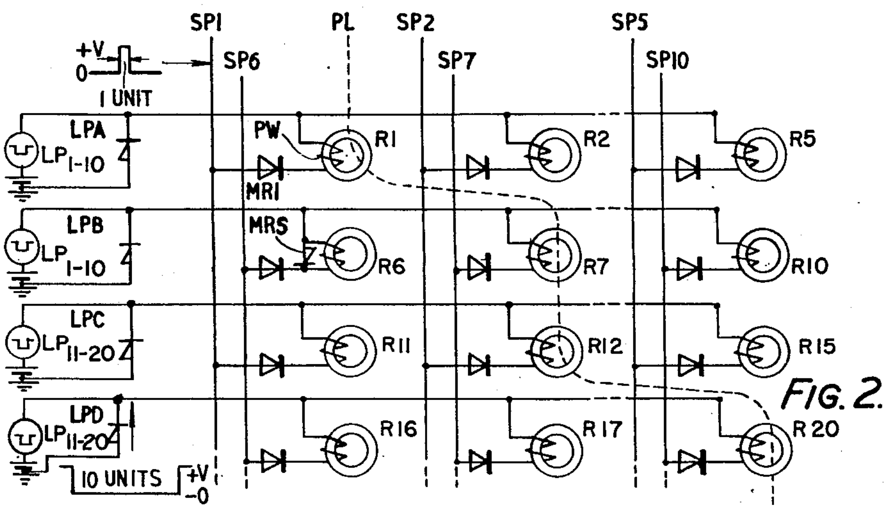
FIGS. 2 and 3 illustrate alternative methods of combining pulses by means of coupling circuits.

FIG. 2 shows one method of using the toroidal core transformers R1—R20 to combine pulses. Only some of the transformer cores are shown and each has a primary winding PW in series with a rectifier MR1. The series-connected primary winding and rectifier are connected between two pulse wires each taken from a set of pulse wires. One set of pulse wires is drawn vertically in FIG. 2 and consists of ten wires, of which wires SP1, SP2, SP5, SP6, SP7 and SP10 are shown, while the other set is drawn horizontally, and comprises four wires LPA, LPB, LPC and LPD. Only one output or code lead PL is shown in dotted lines in FIG. 2 for the sake of clarity and is threaded through cores R1, R7, R12 and R20.

Figure 5:
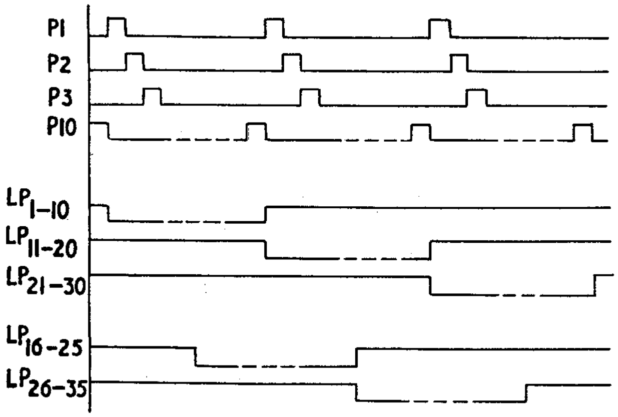
FIG. 5 shows the waveforms of pulses used in FIGS. 2 and 3.

FIG. 5 shows the waveforms and relative durations of the various pulse trains used in the circuit of FIG. 2. The short pulse trains P1—10 are applied to wires SP1—10 respectively, and to the leads LPA, LPD is applied long pulse train $LP_{1\text{-}10}$, whilst long pulse train $LP_{11\text{-}20}$ is applied to leads LPC, LPD. It will be observed that if the pulses of the trains P1 . . . P10 are of one unit duration then the pulses of the trains $LP_{1\text{-}10}$ and $LP_{11\text{-}20}$ are of 10-unit duration. The horizontal set of wires is biased to a potential +V as shown and the pulses of the pulse trains $LP_{1\text{-}10}$, $LP_{11\text{-}20}$ are connected negative-going and limited at earth potential. The pulses of the pulse trains P1 to P10 are positive-going and do not exceed +V in amplitude. Thus, the rectifier MR1 in series with the primary winding PW only conducts when a pulse on the vertical wire coincides with the pulse on the horizontal wire and when this occurs the pulse on the vertical wire is applied to the secondary winding of the transformer which is the pulse lead PL shown dotted in FIG. 2.

Thus it can be seen from FIG. 2 that each of the vertical wires SP1—10 is common to two of the horizontal wires LPA; LPB; LPC; LPD and that the cycle of pulses on wires SP1—10 combined cyclically with the pulses on wires LPA, LPB and LPC, LPD will produce 20 output pulses. That is 20 output pulses for 12 input sources.

During a pulse of long pulse train $LP_{1\text{-}10}$, coincidence occurs in rings R1—R5 between the pulse and a pulse of each of the pulse trains P1—P5 and then in rings R6—R10 between the pulse and a pulse of each of the pulse trains P6—P10. During a pulse of long pulse train $LP_{11\text{-}20}$, coincidence occurs in rings R11—R15 between the pulse and a pulse of each of the pulse trains P1—P5 and then in rings R16—R20 between the pulse and a pulse of each of the pulse trains P6—P10. Since the pulse of $LP_{11\text{-}20}$ immediately succeeds a pulse of $LP_{1\text{-}10}$, the pulses P1—10 coincident with a pulse of $LP_{11\text{-}20}$ are displaced in time and therefore pulses appear successively in rings R1—R10.

For each extra pair of horizontal wires included in the cycle, an extra 10 output pulses is produced i.e. 30 output pulses for 13 sources. Thus, the addition of two further horizontal wires each carrying pulse train $LP_{21\text{-}30}$ as shown in FIG. 5 produces 30 output pulses.

Each toroidal core transformer thus constitutes a pulse source and its impedance when no pulse is being produced, can be lowered by shunting the primary winding of the transformer with a rectifier MRS which conducts only if a pulse of a reverse polarity tends to be produced across the primary winding. This may occur when a large number of pulse leads are threaded through the ring.

Rectifiers, especially of the germanium junction type, employed as the rectifiers MR1 may take an appreciable time in which to restore from the conducting to the non-conducting state and this effect may have undesirable consequences especially when the duration of the pulses connected to wires SP1—10 are very short, say in the region of 1 microsec. or less. The worst effect will be encountered at the end of a long pulse on wires LPA . . . LPD.

For instance when a long pulse say LP1—10 has just gated the tenth pulse P10, the P10 pulse returns to earth while at the same moment the long pulse LP1—10 returns to +V. Thus during the time the rectifier takes to return to its non-conducting state, a current will flow in the winding giving rise to a false pulse in the wire PL threading the core. This can be overcome by using additional long pulse trains, shown as $LP_{16\text{-}25}$ and $LP_{26\text{-}35}$ in FIG. 5 connected in FIG. 2 so that long pulse trains $LP_{1\text{-}10}$ is connected to wire LPA and long pulse train $LP_{11\text{-}20}$ to wire LPC as before, but with long pulse trains $LP_{16\text{-}25}$ and $LP_{26\text{-}35}$ connected to wires LPB and LPD respectively.

With this arrangement $LP_{1\text{-}10}$ gates the first five pulses P1–5 in positions 1–5, while $LP_{11\text{-}20}$ gates the second five pulses P6—10 in positions 11–15. This leaves positions 6–10 in $LP_{1\text{-}10}$ and positions 16–20 in $LP_{11\text{-}20}$ for the rectifier to return to its non-conducting state before the long pulses $LP_{1\text{-}10}$ and 11–20 respectively return to the +V condition.

Figure 3:
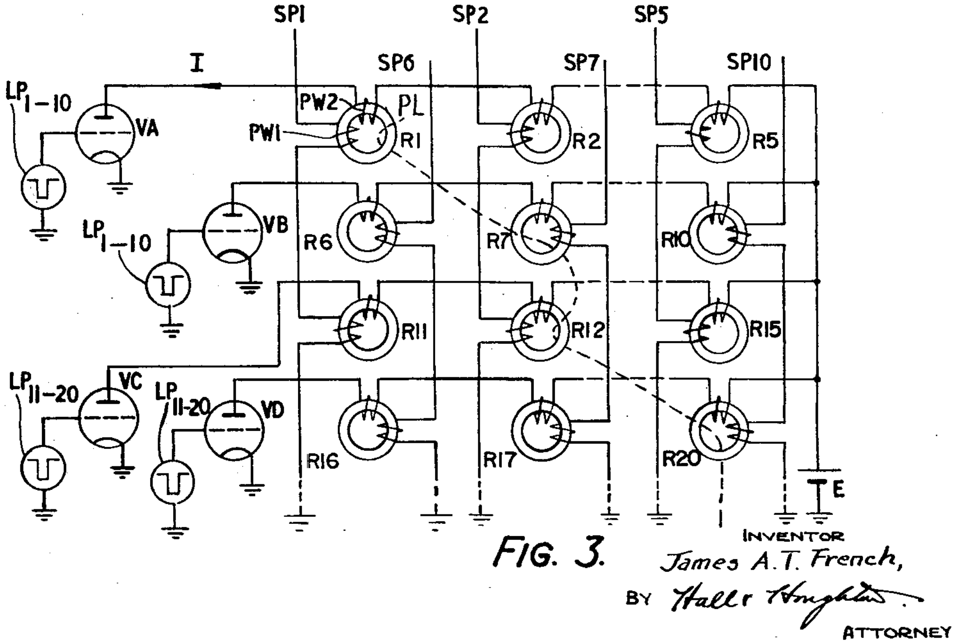
Figure 4:
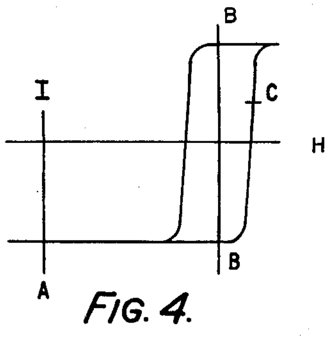
FIG. 4 shows a hysteresis curve.

FIG. 3 shows an alternative method of combining pulses which are carried by the same arrangement of pulse wires as in FIG. 2. Each ring R1—R20 in FIG. 3 has two windings PW1, PW2, and is constructed of a rectangular hysteresis loop type of magnetic material, such a loop being shown in FIG. 4. FIG. 4 will be recognised as illustrating the well known hysteresis curve for a magnetic material showing applied field along the horizontal axis H and magnetic induction along the vertical axis B. The windings PW2 on each ring in the horizontal row of rings are connected in series and a current I passes through them by connecting them, for example, in the anode circuit of valves such as valve VA which is normally conducting and is fed from a positive supply E. The windings PW1 on the rings in the vertical rows of rings are connected in series in two groups using alternate rings as shown, each group of windings being connected to a low impedance source of pulses. Thus, lead SP1 connected to the PW1 windings of R1 and R11 is supplied with pulse train P1, lead SP2 joined to the PW1 windings of R2, R12 is supplied with pulse train P2 and so on. Negative-going long pulses from pulse sources $LP_{1\text{-}10}$, $LP_{11\text{-}20}$ are applied to the grids of the valves VA, VB . . . of sufficient amplitude to cut off the anode currents and in order to produce the required pulses $LP_{1\text{-}10}$ is applied to valves VA and VB and $LP_{11\text{-}20}$ to valves VC and VD. Only one output or code lead PL is shown in dotted lines in FIG. 3 for the sake of clarity and is threaded through cores R1, R7, R12 and R20.

The current I flowing in the windings PW2 of the rings biases the latter magnetically to the point A in the saturation region on the hysteresis loop shown in FIG. 4. Removal of the current I by the negative pulse on the grid of the appropriate valve shifts the operating point to B on the hysteresis loop. A coincidence between pulses applied to the same ring causes a pulse voltage to appear across winding PW1 and the operating point on the hysteresis loop to move during the pulse from B to another point, say C. The operating point moves back to A when a current I is re-applied at the end of the pulse on the horizontal wire and the leads threaded through the rings for a pulse of reverse polarity induced in them.

The current taken from the low impedance sources of the pulses P1, P2 . . . by windings PW1 also passes through the windings of the other rings connected in series but must produce no appreciable voltage drop across those windings. The magnetic effect of current I in windings PW2 must, therefore, always be greater and the effect of the current which flows in windings PW1 should ensure that those cores which are saturated by a current I remain saturated. This requirement determines the maximum value of the current I. The pulse sources formed by the rings always have a very low impedance because in any group of rings having windings connected in series to a source of pulses P1, P2 . . . all the rings except one are saturated magnetically and that one is effectively connected across the low impedance pulse source.

Figure 6:
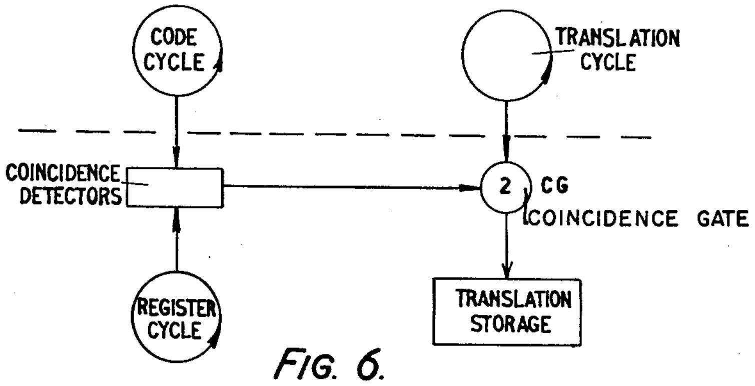
FIG. 6 is an explanatory block schematic diagram of a form of register-translator to which the invention may be applied.

FIG. 6 shows in block schematic form a register-translator to which the invention can be applied. The translator has a code cycle containing all codes for which translations will be needed and which are presented to a coincidence detector to which is also applied the codes contained in the register. The translater also has a translation cycle containing translations of all the codes and synchronised with the code cycle. The translations are applied to a coincidence gate CG to which the output of the coincidence detector is also applied. Thus, when the coincidence detector operates on coincidence between the code presented from the code cycle and that presented from the register a signal is applied to gate CG which opens the gate for a predetermined time. During that time the translation of the code in the register passes into the translation storage.

Figure 7:
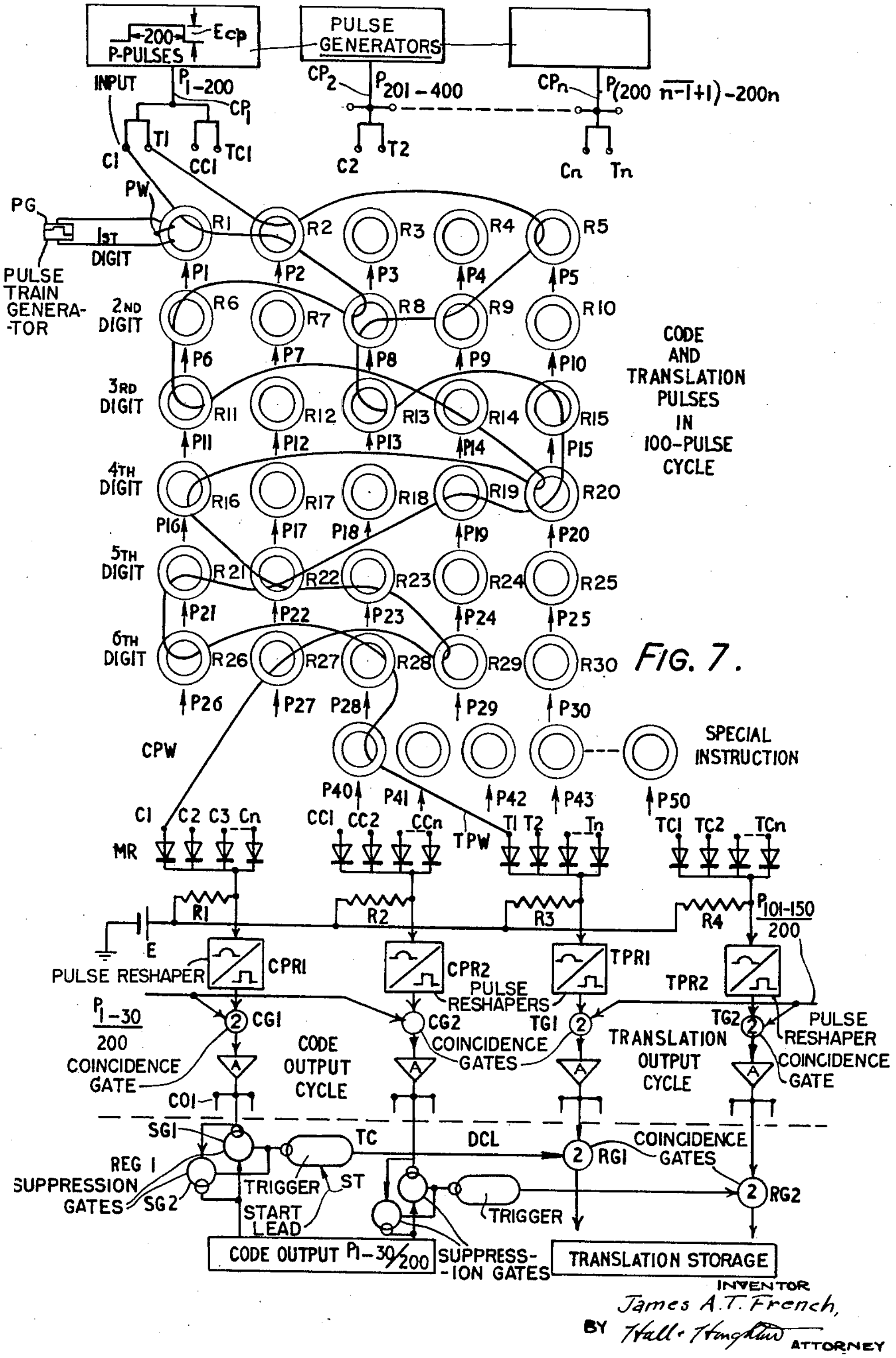
FIG. 7 shows in more detail the register-translator of FIG. 6.

In FIG. 7, which shows the register-translator in more detail, digits are stored in the register REG1 using a two out of five code with reference to a source of 1 microsecond pulses operating in a 200-pulse cycle. That is to say, five pulses, allotted in combinations of two pulses, to represent the digits 1 . . . 9, 0. Each of a number of common points CP1, CP2 . . . CP*n* represent code and translation positions which together may occupy up to one cycle of the 200—1 microsecond pulses. Each code and translation point is thus characterised by a long pulse whose duration is equal to 200—1 microsecond pulses but a long pulse may characterise more than one code and translation point, because the code and translation points are operated cyclically and the number N of long pulses in a cycle is determined by a number of factors including the time available for code comparison and receipt of translation.

The first code point and its corresponding translation point in the cycle are joined respectively to input tags C1 and T1 of common point CP1. The second code point and its corresponding translation point are joined respectively to tags C2 and T2 of common point CP2 and so on. If *n* is equal to 100 then the hundredth code and its translation are joined respectively to tags C*n* and T*n* of common point CP*n*. If the number of codes is greater than 100 then the code and translation points 101 are joined respectively to tags CC1 and TC1 of common point CP1, code and translation points 102 are joined respectively to tags CC2 and TC2 of common point CP2 and so on.

Each tag C is attached to a code wire CPW which is threaded through a predetermined selection of toroidal cores R1—R30 which form low impedance pulse sources. The rings are arranged in sets of five, each set representing one digit of a six-digit number. In a set, the possible values of the digit are represented by combinations of two rings. Thus, each code wire passes through two rings in each set. The cores may consist, for example, of rings of about ¼ inch square cross section of thin (2 mils) mumetal spirally wound or of ferrite material. Each ring has a primary winding PW to which is applied from pulse train generator PG one of the pulses P1—P30 required to make up the code and translation. The code wire CPW forms a single turn secondary winding of low impedance in which a pulse output of value E*p* volts can be produced.

The arrangement of feeding pulses to the toroidal cores may be as shown in FIG. 7 in which each pulse is generated by an individual source, or it may take other forms such as shown in FIGS. 2 and 3.

Similarly each tag T has a translation wire TPW attached to it which is passed through a combination of the rings taken two from each set of rings as explained above in the case of the code wires.

After the code and translation wires have been threaded through the required rings they are joined to output tags designated in like manner to the input tags i.e. input tag C1 is connected to output tag C1 and so on.

Thus, in FIG. 7 it will be seen that a code is built up on a code wire by passing the wire through a selection of the rings each of which is supplied with one of a number of pulse trains designated P1—P30 of a 100 pulse cycle. The input appearing on a code wire thus consists of a selection of 12 of the pulses P1—P30. The translations are built up in a similar fashion. Further, it will be appreciated that as each common point is fed with a long pulse of duration equal to that of a cycle of 200 pulses then pulses P1 to P30 appear twice during one long pulse i.e. they appear firstly at positions 1 to 30, and secondly at positions 101 to 130 in the 200-pulse cycle.

In addition to passing through the translation rings, the translation wires may also pass through rings marked "special instructions" in FIG. 7. The special instructions rings are supplied with pulses in positions not already allocated for the codes or translations and in FIG. 7 positions P40 to P50 are used. The special instructions rings are for use in connection with the translation wires only and serve to provide instruction to the translation input circuit, for example, an indication of when the translation received by the input circuit should be sent out.

Thus, in FIG. 7, a code appears in pulse positions P1—P30 and the translation in pulse positions P101—P130 and P140—P150 in the 200-pulse cycle. There are therefore a certain number of unused pulse positions in the 200-pulse cycle.

The terminals C1, C2, etc. are commoned through gating rectifiers MR to a resistor R1 or other suitable impedance which is biased by a positive potential E. Terminals T1, T2, etc. are similarly connected to a resistor R3. It is arranged that the pulse voltages E*cp* and that applied to the windings PW and now designated E*p* both tend to make the rectifiers MR conduct, but that although either E*cp* or E*p* alone is less than E and does not produce an output across resistor R1, etc. the sum of E*cp* and E*p* is greater than E so that the coincidence of the pulses produces an output across the resistors R1, etc. The codes which are wired on to terminals C1, C2, etc. thus appear in sequence across the resistor R1. The voltage across R1 is applied to a pulse reshaping device CPR1 which may consist of an amplifier and level discriminator and may include means for retiming the pulses.

Because the code and translation wires share the rings it is necessary to gate out the pulses on the code wire during the first 100 pulse positions of the long pulse and to gate out the pulses on the translation wires during the second 100 pulse-positions of the long pulse. This is achieved by coincidence gates CG1, CG2 . . . and by coincidence gates TG1, TG2 . . . Thus, in the example shown in FIG. 7 code coincidence gates CG1, CG2 . . . are each supplied with pulse trains P1 to P30 to gate the code pulses and translation coincidence gates TG1, TG2 . . . are each supplied with pulse trains P101 to P150 in order to gate the pulses of pulse trains P1 to P30 in positions 101 to 130 and the pulses of pulse trains P40 to P50 in positions 140 to 150 of the long pulses.

FIG. 7 also shows the coincidence detectors in more detail. Each detector consists of two gates SG1, SG2 and a trigger circuit TC. The trigger circuit when not inhibited connects a D.C. condition on its output lead DCL applied to register coincidence gate RG1. Each trigger has a start lead ST which brings the trigger to an uninhibited condition at the commencement of each 200-pulse cycle. The code cycle in the register operates in the same pulse positions as the code cycle applied to the coincidence gates CG1, CG2 . . . in the translator and coincidence is sought between pulses appearing on a translator code output lead such as CO1 and the code in the register. Whenever coincidence is not found the trigger is immediately reset thereby removing the D.C. condition on lead DCL. If coincidence is found for each one of the digits forming the code the trigger remains operated so that the translation pulses are gated by P101 to P150 and are fed via RG1 into the translation storage.

Figure 8:
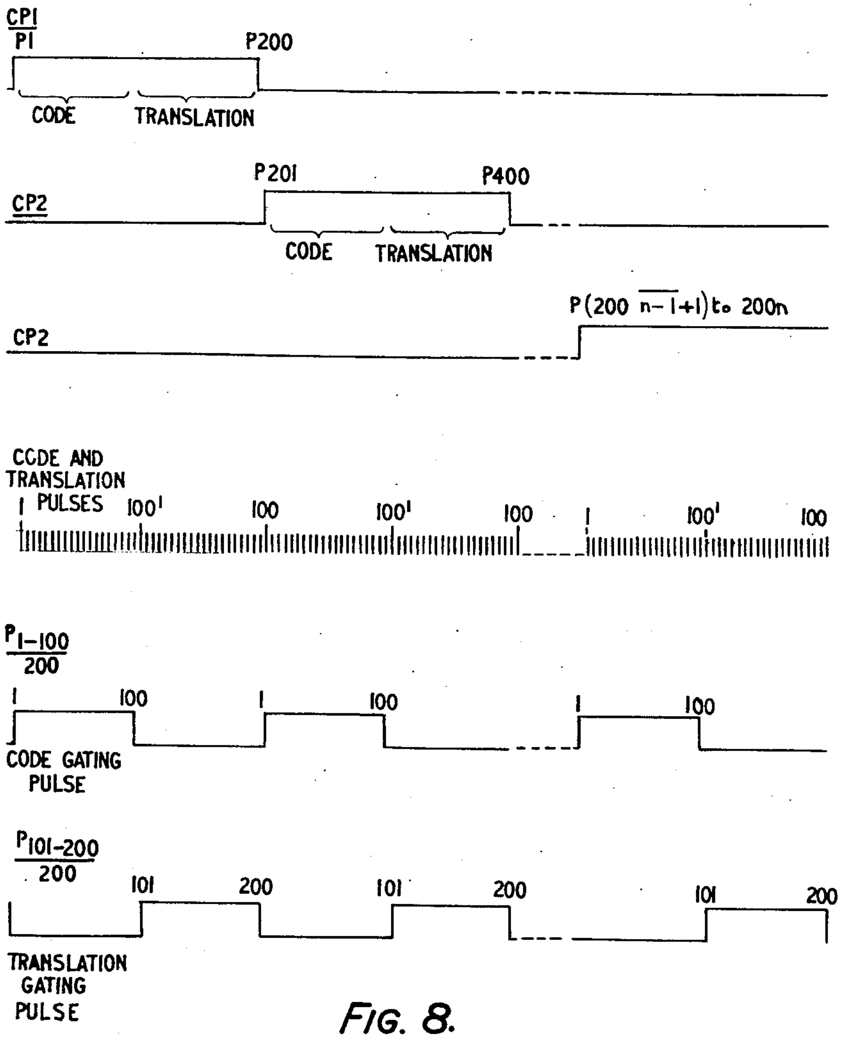
FIG. 8 shows the waveforms of pulse trains used in FIG. 7.

FIG. 8 shows the waveforms of pulse trains for the circuit of FIG. 7 but it will be understood that only certain of the pulse positions of the 200-pulse cycle are used in the embodiment described above with reference to FIG. 7.

The form of pulse generating system employing toroidal core transformers is particularly suitable for register-translators since it is extremely economical in equipment. Its memory is formed by threading the code and translation wires through the rings and each wire is terminated at each end on individually numbered tags to facilitate removal when a code or translation has to be changed. It will be understood that the translator is extremely flexible and is not restricted to the number of digits employed in the example described above or to the particular arrangement of pulses.

I claim:

1. A register translator comprising in combination a plurality of transformer cores, an input winding for each core, a plurality of pulse train generators, connections from said generators to said input windings, a number of code wires each inductively coupled by said cores to a selection of said input windings, and, a number of translation wires each inductively coupled by said cores to another selection of said input windings, each translation wire corresponding with one of said code wires, rectifiers series connected with said code wires and with said translation wires, biassing means for rendering said rectifiers normally nonconductive, pulsing means connected to both said code wires and said translation wires, coincidence detection means, means for cyclically presenting coded pulses to said detection means, means for connecting said code wires to said detection means, translation storage apparatus, gating means connected between said translation wires and said translation storage apparatus for gating into said storage apparatus the output of a translation wire upon coincidence being detected by said detecting means.

2. A register translator comprising in combination a plurality of toroidal transformer cores, a first group of pulse train sources of equal duration pulses, an input winding on each of said cores, electric leads connecting each winding to a different one of said pulse train sources, a number of code wires each of which is threaded through a selection of said cores, and, a number of translation wires, each translation wire corresponding with one of said code wires and being threaded through another combination of said cores, rectifiers in series connection with said code and translation wires, biassing means for rendering said rectifiers normally non-conducting, a second source of pulse trains the pulses of which are of a duration at least equal to the sum of the durations of the pulses from said first group of pulse train sources, connections from said second source to each code and translation wire, coincidence detecting means connected to said code wires, means for cyclically presenting coded pulses to said detection means, gating means connected to said translation leads, a translation store connected to said gating means and a connection from the latter to said detection means whereby said gating means is rendered operative on the detection of coincidence by said detection means.

References Cited in the file of this patent

UNITED STATES PATENTS

| | | |
|---|---|---|
| 2,614,176 | Dimond | Oct. 14, 1952 |
| 2,691,155 | Rosenberg et al. | Oct. 5, 1954 |
| 2,691,156 | Saltz et al. | Oct. 5, 1954 |
| 2,740,949 | Counihan et al. | Apr. 3, 1956 |
| 2,753,545 | Lund | July 3, 1956 |
| 2,776,419 | Rajchman et al. | Jan. 1, 1957 |
| 2,784,390 | Chien | Mar. 5, 1957 |
| 2,809,367 | Stuart-Williams | Oct. 8, 1957 |
| 2,849,703 | Bindon et al. | Aug. 26, 1958 |
| 2,853,698 | Nettleton | Sept. 23, 1958 |